Figure 1:
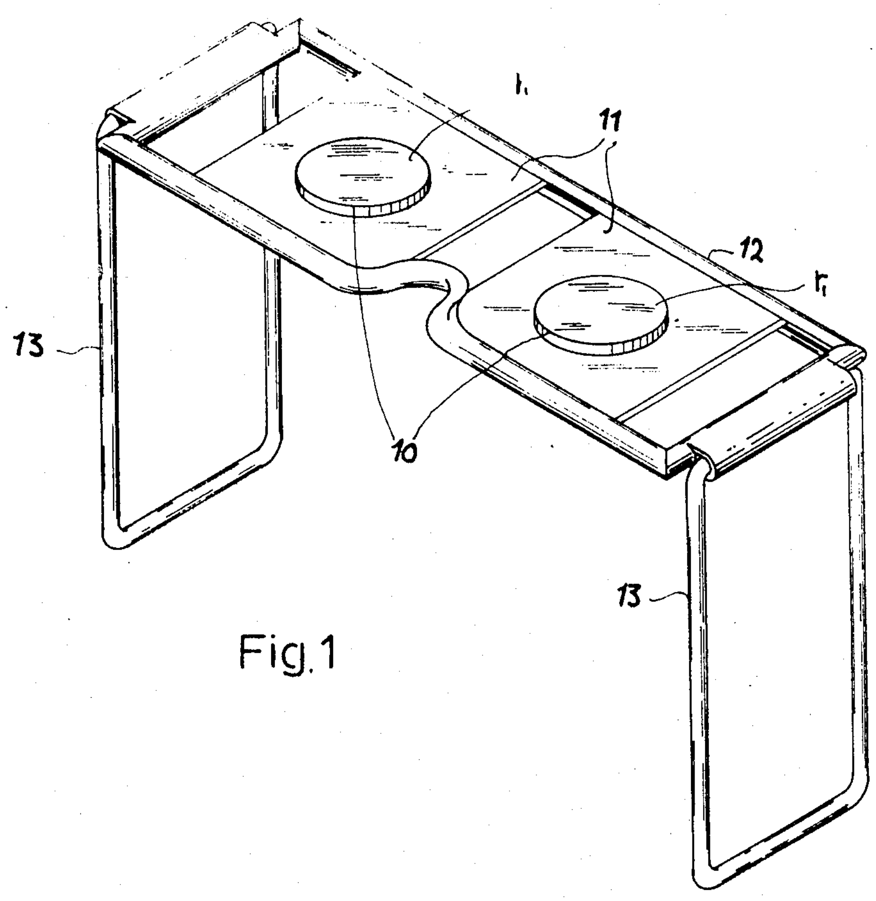

Jan. 17, 1967 A. MILINOWSKI 3,298,772

TRIPLET-TYPE MAGNIFYING LENS

Filed Aug. 2, 1963

ARTHUR MILINOWSKI
*INVENTOR.*

BY Karl F. Ross
AGENT

United States Patent Office 3,298,772

Patented Jan. 17, 1967

3,298,772

TRIPLET-TYPE MAGNIFYING LENS

Arthur Milinowski, Norwalk, Conn., assignor to Republic Lens Co., Inc., New York, N.Y., a corporation of New York Filed Aug. 2, 1963, Ser. No. 299,543

2 Claims. (Cl. 88—57)

My present invention relates to an optical magnifying lens for the direct visual examination of pictorial objects and, particularly though not exclusively, to a lens of this type adapted to be used in pairs of stereoscopic viewing of correlated photographs and the like.

The general object of this invention is to provide a lens of this character which satisfies the demand for high-quality optical performance expected of scientific instruments such as, for example, stereoscopic viewers of aerial photographs.

One of the requirements most difficult to satisfy in such viewers is the maintenance of uniformly good correction throughout the field, in order to avoid the occurence of geometrical and chromatic aberrations in the outlying image portions. Thus, the invention particularly aims at the suppression of coma, field curvature, astigmatism and color fringes at the edges of the field, as frequently observed even with highly corrected lenses yielding satisfactory resolution in the vicinity of their optical axis.

In the case of a direct viewer, contrary to other optical devices such as cameras and projectors, there is no fixed pupil position relative to the lens since the pupil is that of the eye of the observer. Thus, it is a further object of my invention to provide a lens adapted to perform satisfactorily in a variety of axial and lateral eye positions.

A more specific object of the instant invention is to provide a viewing lens for the purpose set forth with a lateral magnification of substantially 4:1, i.e. wherein the apparent separation of two given points of the image is approximately four times that seen by the observer without the lens at normal reading distance (about 25 cm.), with an ocular accommodation of substantially one-half to one diopter (i.e. a focusing of the eye upon a distance between about one and two meters), and a field of view equal to or exceeding 50 mm. in diameter, all with uniformly good distortion correction and a minimum of spherical, chromatic and other aberrations.

Since a fourfold magnification requires an effective focal length equal to about one-fourth the normal reading distance, lenses of such high magnifying power must be held close to the picture under examination; as this presents an inconvenience to the user of a viewing device resting on a horizontal supporting surface such as a table top, it is another object of my invention to provide a magnifier of this type whose back-focal length is relatively large, i.e. substantially equal to the effective focal length thereof.

The foregoing objects are realized, in accordance with the present invention, by the provision of a lens in the shape of a triplet composed of a negative first member of at least approximately plano-concave configuration, a biconvex second member preferably of lower refractive index than the first member, and a negative third member in the shape of a dispersive meniscus turning its more strongly curved surface toward the side of the observer's eye, i.e. forwardly toward the second lens member onto which it is cemented. The third member has a refractive index higher than that of the second member, and preferably also higher than that of the first member, so that the two cemented surfaces bounding the biconvex lens member are both dispersive in character. Advantageously, the radius of the first cemented surface (forwardly of the biconvex member) has an absolute length approximately twice that of the radius of the second cemented surface and somewhat greater than that of the radius of the rear lens surface, i.e. the outer surface of the third member.

Though in many instances a triplet can be regarded as equivalent to and be replaced by three closely air-spaced individual lens members, I have found that the use of a cemented lens is more advantageous not only because of the simplified mounting but also on account of the absence of annoying reflections that may occur at an internal boundary constituted by an air gap even when the lens surfaces are provided with anti-reflection coatings. The same consideration, i.e. the avoidance of reflections, suggests the establishment of a slight convexity at the front surface of the forward lens member although, in principle, a plane surface may also be used.

Figure 2:
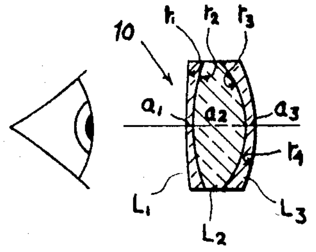

The invention will be described in greater detail with reference to the accompanying drawing in which:

FIG. 1 is a perspective view of a stereoscopic device provided with a pair of magnifying lenses according to the invention; and FIG. 2 is a cross-sectional view of one of the lenses of FIG. 1.

The stereoscopic viewer illustrated in FIG. 1 comprises a pair of lenses 10 whose mounts 11 are slidably carried on a frame 12 which is supported by legs 13. The legs 13 are hinged to the frame, being foldable thereunder for storage, and are so dimensioned as to support the lenses 10 at the proper viewing distance above a table top or other surface carrying the pictures to be analyzed. The slidable disposition of the mounts 11 enables adjustment of the relative lens spacing to fit the interpupillary distance of the observer, normally ranging between about 52 and 72 mm., these mounts preferably being also axially adjustable for individually raising and lowering the lenses for optimum focusing. It will, of course, be necessary to choose the spacing of the lenses from the picture surface at somewhat less than their back- focal length.

Each of the lenses 10 is a triplet as shown in FIG. 2. The triplet is composed of a nearly plano-concave negative lens member $L_1$, with a front surface having a radius of curvature $r_1$, cemented onto a biconvex lens member $L_2$ along a first internal surface of radius $r_2$; member $L_2$ is cemented onto a meniscus-shaped negative lens member $L_3$ along a second internal surface of radius $r_3$, the latter member having a rear surface of radius $r_4$. The axial thicknesses of lens members $L_1$, $L_2$, $L_3$ have been designated $a_1$, $a_2$, $a_3$.

In practice, the absolute length of $r_1$ may range from about $7r_4$ to infinity; the absolute length of $r_2$ may vary between about $0.9r_4$ and $1.4r_4$, whereas $r_3$ may lie between about $0.5r_4$ and $0.71r_4$ (with, preferably, $r_2/r_3$ 2). Suitable ranges for the axial thicknesses are from $0.01r_4$ to $0.25r_4$ for $a_1$ and $a_3$, and from $0.15r_4$ to $0.55r_4$ for $a_2$. The refractive index $n_d$ of lens member $L_1$ may range between about 1.515 and 1.550; the index of lens member $L_2$ may be less than that of lens member $L_1$ by about 0.005 to 0.030 and less than that of lens member $L_3$ by about 0.12 to 0.18. It should be noted, however, that in some instances the refractive index of member $L_2$ may also substantially equal or even slightly exceed that of member $L_1$, the forwardly convex boundary between these members then serving principally or exclusively for color correction; to this end the dispersion or Abbé number $\nu$ of member $L_1$ may range between about 45 and 56, falling short of the corresponding number of member $L_2$ by about 8 to 17 while the $\nu$ value of member $L_2$ may exceed that of member $L_3$ by about 25 to 38.

A lens of this description will have excellent correction throughout a field of view whose diameter is at least equal to four-fifths of the effective focal length, or about 50 mm. with a focal length corresponding to approximately a quarter of the usual reading distance, thereby providing a magnification of substantially 4:1.

The following table lists a typical set of parameters, falling within the aforestated limits, for a lens representing a preferred embodiment of my invention:

TABLE

| Lens member | Radius (mm.) | Thickness (mm.) | $n_d$ | $\nu$ |
|---|---|---|---|---|
| | $r_1=+370.84$ | | | |
| $L_1$ | $r_2=+34.66$ | $a_1=1.52$ | 1.52620 | 51.00 |
| $L_2$ | $r_3=-17.60$ | $a_2=9.52$ | 1.51671 | 64.20 |
| $L_3$ | $r_4=-29.00$ | $a_3=1.52$ | 1.66662 | 33.09 |

The lens represented in the table has an effective focal length of 63.92 mm. and a back-focal length of 63.80 mm. which is thus very close to the focal length itself. Its diameter is 24.1 mm. to give the desired field of view upwards of 50 mm. in diameter.

Departures from the absolute or relative numerical values given above are, of course, possible, especially in regard to the axial thicknesses which are not critical, without departing from the spirit and scope of my invention as defined in the appended claims.

I claim:

1. A magnifying lens composed of a first, a second and a third lens member cemented together, the magnitude in linear units of the radii $r_1$ to $r_4$ and the axial thicknesses $a_1$ to $a_3$ of said first, second and third lens members $L_1$, $L_2$, $L_3$, their refractive indices $n_d$ and their dispersion numbers $\nu$ being substantially as given in the following table:

TABLE

| Lens member | Radius | Thickness | $n_d$ | $\nu$ |
|---|---|---|---|---|
| | $r_1=+370.84$ | | | |
| $L_1$ | $r_2=+34.66$ | $a_1=1.52$ | 1.52620 | 51.00 |
| $L_2$ | $r_3=-17.60$ | $a_2=9.52$ | 1.51671 | 64.20 |
| $L_3$ | $r_4=-29.00$ | $a_3=1.52$ | 1.66662 | 33.09 |

2. A lens as defined in claim 1 wherein said lens members have a diameter of substantially 24.1 linear units.

References Cited by the Examiner

UNITED STATES PATENTS 2,366,228 1/1945 Abrams et al. ---------- 88—29

FOREIGN PATENTS 851,297 10/1939 France.

JEWELL H. PEDERSEN, *Primary Examiner.*

R. J. STERN, *Assistant Examiner.*